United States Patent
Xie

(10) Patent No.: US 11,787,988 B2
(45) Date of Patent: Oct. 17, 2023

(54) TWO-COMPONENT ADHESIVE COMPOSITIONS AND METHODS OF MAKING SAME

(71) Applicant: Dow Global Technologies LLC, Midland, MI (US)

(72) Inventor: Rui Xie, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 96 days.

(21) Appl. No.: 16/316,964

(22) PCT Filed: May 22, 2017

(86) PCT No.: PCT/US2017/033725
§ 371 (c)(1),
(2) Date: Jan. 10, 2019

(87) PCT Pub. No.: WO2018/013223
PCT Pub. Date: Jan. 18, 2018

(65) Prior Publication Data
US 2019/0292428 A1    Sep. 26, 2019

Related U.S. Application Data

(60) Provisional application No. 62/360,704, filed on Jul. 11, 2016.

(51) Int. Cl.
| | |
|---|---|
| *C09J 175/04* | (2006.01) |
| *C08G 18/10* | (2006.01) |
| *C08G 18/42* | (2006.01) |
| *C08G 18/76* | (2006.01) |
| *C09J 5/06* | (2006.01) |

(52) U.S. Cl.
CPC ............ *C09J 175/04* (2013.01); *C08G 18/10* (2013.01); *C08G 18/4202* (2013.01); *C08G 18/7671* (2013.01); *C09J 5/06* (2013.01); *C09J 2475/00* (2013.01)

(58) Field of Classification Search
CPC .................................................... C09J 175/04
See application file for complete search history.

(56) References Cited

U.S. PATENT DOCUMENTS

| | | |
|---|---|---|
| 4,870,150 A | 9/1989 | Bandlish et al. |
| 6,833,044 B2 * | 12/2004 | Imai ............... C08G 18/12 156/324 |
| 2005/0020706 A1 | 1/2005 | Kollbach et al. |
| 2007/0088145 A1 * | 4/2007 | Mgaya ................ C09J 5/00 528/44 |
| 2013/0288060 A1 | 10/2013 | Pind et al. |
| 2016/0053147 A1 | 2/2016 | Kelch et al. |

FOREIGN PATENT DOCUMENTS

| | | |
|---|---|---|
| CN | 1873878 A | 12/2006 |
| JP | 03678325 B2 | 8/2005 |

OTHER PUBLICATIONS

PCT/US2017/033725, International Search Report and Written Opinion dated Aug. 11, 2017.
PCT/US2017/033725, International Preliminary Report on Patentability dated Jan. 15, 2019.

* cited by examiner

*Primary Examiner* — Daniel H Lee
(74) *Attorney, Agent, or Firm* — Boyle Fredrickson, S.C.

(57) ABSTRACT

A two-component solventless adhesive composition is disclosed. The composition comprises an isocyanate component comprising an isocyanate prepolymer that is the reaction product of a polyisocyanate and an isocyanate reactive component comprising at least 40 wt % of a polyester polyol, based upon the dry weight of the isocyanate reactive component, a polyol component having an average functionality between 2.5 and 4.5 and an average molecular weight between 250 and 1,000, and comprising at least 30 wt % of a polyether polyol, based upon the dry weight of the polyol component, and an adhesion promoter. A method for forming laminates comprising the disclosed adhesive compositions is also disclosed.

8 Claims, No Drawings

TWO-COMPONENT ADHESIVE COMPOSITIONS AND METHODS OF MAKING SAME

REFERENCE TO RELATED APPLICATIONS

The present application claims the benefit of U.S. Provisional Application No. 62/360,704, filed on Jul. 11, 2016.

FIELD OF THE DISCLOSURE

The instant disclosure relates to solventless adhesive compositions. More particularly, the disclosure relates to two-component solventless polyurethane adhesive compositions for use in the fabrication of laminates. The disclosed compositions exhibit improved thermal and chemical resistance while maintaining low application viscosity and extended potlife, even at elevated temperatures. The disclosure further relates to methods of forming laminate structures comprising the disclosed adhesive compositions and the laminates themselves.

BACKGROUND AND SUMMARY OF THE DISCLOSURE

Adhesive compositions are useful for a wide variety of purposes. For instance, adhesive compositions are used to bond together substrates such as polyethylene, polypropylene, polyester, polyamide, metal, paper, or cellophane to form composite films, i.e., laminates. The use of adhesives in different end-use applications is generally known. For example, adhesives can be used in the manufacture of film/film and film/foil laminates used in the packaging industry, especially for food packaging. Adhesives used in laminating applications, or "laminating adhesives," can be generally placed into three categories: solvent-based, water-based, and solventless. The performance of an adhesive can vary by category and by the application in which the adhesive is applied.

Solventless laminating adhesives can be applied up to 100% solids without either organic solvents or an aqueous carrier. Because no organic solvent or water has to be dried from the adhesive upon application, these adhesives can be run at high line speeds. Solvent and water-based laminating adhesives are limited by the rate at which the solvent or water can be effectively dried and removed from the laminate structure after application of the adhesive. In addition, solventless laminating adhesives provide environmental, health, and safety benefits.

Within the category of solventless laminating adhesives, there are many varieties. One particular variety includes two-component polyurethane-based laminating adhesives premixed prior to application. Typically, a two-component polyurethane-based laminating adhesive includes a first component comprising an isocyanate-containing prepolymer and/or a polyisocyanate and a second component comprising a polyol. In particular, the second component comprises a polyether and/or polyester functionalized with two or more hydroxyl groups per molecule. The isocyanate and polyol components are combined in a predetermined ratio, or "premixed," to form an adhesive composition. The adhesive composition can then be applied on a substrate which can be laminated to another substrate to form a laminate structure. The laminate structure can comprise a number of laminated films suitable for use in food packaging applications.

Chemical and thermal resistance are important properties for solventless adhesives used in particularly demanding food packaging applications, e.g., hot fill, boil-in-bag, and retort applications. Aromatic polyester polyols are widely used in solvent-based laminating adhesives to achieve the desired thermal and chemical resistance. Aromatic polyester polyols tend to exhibit higher viscosity and greater reactivity than polyether polyols. The use of aromatic polyester polyols in solventless laminating adhesives is limited due to concern of high viscosity during application of the adhesive to a film and short potlife after the components of the adhesive composition are mixed.

Because of the concerns with polyester polyols, a significant amount of polyether polyols, such as those based on polypropylene oxide, are used in solventless laminating adhesives. However, conventional polyether-based laminating adhesives exhibit less desirable performance in hot fill, boil-in-bag, and retort applications due to poor chemical and temperature resistance.

Accordingly, two-component solventless polyurethane-based laminating adhesive compositions with low application viscosity and extended potlife and exhibiting improved chemical and thermal resistance, and methods of making laminates comprising same, are desirable.

Two-component solventless polyurethane adhesive compositions are disclosed. In some embodiments, the solventless adhesive composition comprises an isocyanate component comprising an isocyanate prepolymer that is the reaction product of a polyisocyanate and an isocyanate reactive component. In some embodiments, the isocyanate reactive component comprises at least 40 wt % of a polyester polyol, based upon the dry weight of the isocyanate reactive component. In some embodiments, the isocyanate reactive component further comprises a polyether polyol. For instance, the polyether polyol can be blended with the polyester polyol, provided the polyester polyol accounts for at least 40 weight percent of the isocyanate reactive component.

In some embodiments, the adhesive composition further comprises a polyol component having an average functionality between 2.5 and 4.5 and an average molecular weight between 250 and 1,000. In some embodiments, the polyol component comprises at least 30 wt % of a polyether polyol, based upon the dry weight of the polyol component. In some embodiments, the polyether polyol of the polyol component is selected from a polybutylene oxide polyol, a polybutylene oxide-propylene oxide copolymer polyol, a polybutylene oxide-polyethylene oxide copolymer polyol, and mixtures of two or more thereof. In some embodiments, the polyol component further comprises at least one selected from polypropylene oxide polyol, a natural oil based polyol, a polyester polyol, and mixtures of two or more thereof.

In some embodiments, the adhesive composition still further comprises an adhesion promoter. In some embodiments, the adhesion promoter is selected from a phosphate ester, an epoxy terminated resin, a silane, a phosphoric acid, or mixtures of two or more thereof.

A method for forming a laminate is also disclosed. In some embodiments, the method comprises forming a two-component solventless adhesive composition comprising an isocyanate component comprising an isocyanate prepolymer that is the reaction product of a polyisocyanate and an isocyanate reactive component comprising at least 40 wt % of a polyester polyol, a polyol component having an average functionality between 2.5 and 4.5 and an average molecular weight between 250 and 1,000, and comprising at least 30 wt % of a polyether polyol, and an adhesion promoter, applying a layer of the adhesive composition to a surface of a first substrate, bringing the layer into contact with a surface of a second substrate to form a laminate, and curing the adhesive composition. A laminate formed by this method is also disclosed.

DETAILED DESCRIPTION OF THE DISCLOSURE

The two-component solventless adhesive composition according to this disclosure comprises an isocyanate component and a polyol component. In some embodiments, the components can be mixed to form a curable adhesive composition.

Isocyanate Component

The isocyanate-containing compound can be selected from the group consisting of an isocyanate monomer, a polyisocyanate (e.g., dimers, trimmers, etc.), an isocyanate prepolymer, and mixtures of two or more thereof. As used herein, a "polyisocyanate" is any compound that contains two or more isocyanate groups.

Further, the isocyanate-containing compound can be selected from the group consisting of aromatic polyisocyanates, aliphatic polyisocyanates, cycloaliphatic polyisocyanates, and combinations of two or more thereof. An "aromatic polyisocyanate" is a polyisocyanate that contains one or more aromatic rings. An "aliphatic polyisocyanate" contains no aromatic rings. A "cycloaliphatic polyisocyanate" is a subset of aliphatic polyisocyanates, wherein the chemical chain is ring-structured.

Suitable aromatic polyisocyanates include, but are not limited to, 1,3- and 1,4-phenylene diisocyanate, 1,5-naphthylene diisocyanate, 2,6-toluene diisocyanate, 2,4-toluene diisocyanate (2,4-TDI), 2,4'-diphenylmethane diisocyanate (2,4'-MDI), 4,4'-diphenylmethane diisocyanate, 3,3'-dimethyl-4,4'-biphenyldiisocyanate ("TODI") and isomers thereof, polymeric isocyanates, and mixtures of two or more thereof.

Suitable aliphatic polyisocyanates have 3 to 16 carbon atoms, or 4 to 12 carbon atoms, in the linear or branched alkylene residue. Suitable cycloaliphatic polyisocyanates have 4 to 18 carbon atoms, or 6 to 15 carbon atoms, in the cycloalkylene residue. Cycloaliphatic diisocyanates refer to both cyclically and aliphatically bound NCO groups, such as isophorone diisocyanate and diisocyanatodicyclohexylmethane ($H_{12}$MDI).

Suitable aliphatic and cycloaliphatic polyisocyanates include, but are not limited to, cyclohexane diisocyanate, methylcyclohexane diisocyanate, ethylcyclohexane diisocyanate, propylcyclohexane diisocyanate, methyldiethylcyclohexane diisocyanate, propane diisocyanate, butane diisocyanate, pentane diisocyanate, hexane diisocyanate, heptane diisocyanate, octane diisocyanate, nonane diisocyanate, nonane triisocyanate, such as 4-isocyanatomethyl-1,8-octane diisocyanate (TIN), decane di- and triisocyanate, undecane di- and triisocyanate and dodecane di- and triisocyanate, isophorone diisocyanate (IPDI), hexamethylene diisocyanate (HDI), diisocyanatodicyclohexylmethane ($H_{12}$MDI), 2-methylpentane diisocyanate (MPDI), 2,2,4-trimethylhexamethylene diisocyanate/2,4,4-trimethylhexamethylene diisocyanate (TMDI), norbornane diisocyanate (NBDI), xylylene diisocyanate (XDI), tetramethylxylylene diisocyanate, and dimers, trimers, and mixtures of the of two or more thereof.

Additional isocyanate-containing compounds suitable for use according to this disclosure include, but are not limited to, 4-methyl-cyclohexane 1,3-diisocyanate, 2-butyl-2-ethyl-pentamethylene diisocyanate, 3(4)-isocyanatomethyl-1-methylcyclohexyl isocyanate, 2-isocyanatopropylcyclohexyl isocyanate, 2,4'-methylenebis(cyclohexyl) diisocyanate, 1,4-diisocyanato-4-methyl-pentane, and mixtures of the of two or more thereof.

Suitable isocyanate prepolymers for use according to this disclosure are reaction products of a polyisocyanate and an isocyanate reactive component at a stoichiometry ratio (NCO/OH) greater than 2.0, or from 3.0 to 10.0, or from 4.0 to 7.0. The polyisocyanate is selected from aromatic isocyanates, aliphatic isocyanates, cycloaliphatic isocyanates, and mixtures thereof, as described above. Suitable isocyanate reactive components that can react with polyisocyanates to form isocyanate prepolymers, also known as "polyurethane prepolymers," include compounds with hydroxyl groups, amino groups, and thio groups. Suitable isocyanate reactive components include a polyether polyol, a polyester polyol, a polycaprolactone polyol, a polyacrylate, a polycarbonates polyol, a natural oil based polyol, and mixtures of two or more thereof. In some embodiments, the isocyanate reactive component comprises only a polyester polyol or a blend of polyester polyols. In some embodiments, the isocyanate reactive component comprises a blend of polyester polyols and polyether polyols.

In some embodiments, the average hydroxyl number for the isocyanate reactive component can be from 5 to 2,000 mg KOH/g, or from 14 to 850 mg KOH/g, or from 28 to 500 mg KOH/g, or from 35 to 450 KOH/g. In some embodiments, the average molar mass of the isocyanate reactive component is from 62 to 20,000 g/mol, or from 250 to 12,000 g/mol, or from 500 to 6,000 g/mol, or from 800 to 3,000 g/mol. In some embodiments, the average functionality of the isocyanate reactive component can be from 1.0 to 6.0, preferably from 1.8 to 4.0, and most preferably from 2.0 to 3.0.

Polyol Component

The solventless adhesive composition further comprises a polyol component comprising at least one of a polyether polyol, a polyester polyol, a polycarprolactone polyol, a polycarbonate polyol, a natural oil based polyol, and mixtures of two or more thereof. In some embodiments, the polyol component has an average functionality from 2.0 to 6.0, or from 2.5 to 4.5 and an average molecular weight from 150 to 2,500 g/mol, or from 250 to 1,050 g/mol.

Suitable polyether polyols for use according to this disclosure include, but are not limited to, polypropylene glycols, polytetramethylene ether glycols, polybutylene oxide based polyols, or mixtures and copolymers of them.

Suitable polypropylene glycols for use according to this disclosure include, but are not limited to, polyols based on propylene oxide, ethylene oxide, or mixture of them with initiators selected from propylene glycol, dipropylene glycol, sorbitol, sucrose, glycerin, and/or mixtures of them, available from the Dow Chemical Company under the trade name of VORANOL™ the BASF Company under the trade name of PLURACOL™, Lonza under trade name POLY-G™, POLY-L™, and POLY-Q™, and from Covestro AG under the trade name ACCLAIM™. Polypropylene glycols having a functionality between 2.0 to 6.0 and an average molecular weight from 250 to 1,500 are particularly suitable for use according to this disclosure.

Suitable polytetramethylene ether glycols for use according to this disclosure include, but are not limited to, POLY-THF™ from the BASF Company, TERATHAN™ from Invista, PTMG™ from Mitsubishi, and PTG™ from Dairen, having an average molecular weight from 250 to 1,500 g/mol.

Suitable polybutylene oxide based polyols for use according to this disclosure include, but are not limited to, a polybutylene oxide homopolymer polyol, a polybutylene oxide-polypropylene oxide copolymer polyol, and a polybutylene oxide-polyethylene oxide copolymer polyol, having an average molecular weight from 150 to 12,000 g/mol, or from 250 to 4,000 g/mol, or from 350 to 2,000 g/mol, and a functionality from 2.0 to 8.0, or from 2.0 to 6.0, or from 2.0 to 4.0. The copolymer polyols based on butylene oxide and propylene oxide or butylene and ethylene oxide can contain 10 to 100% of butylene oxide, or 30 to 100% butylene oxide, or 50 to 100 wt % of butylene oxide.

Suitable polyester polyols for use according to this disclosure include, but are not limited to, aliphatic polyester polyols, aromatic polyester polyols, copolymers of aliphatic and aromatic polyester polyol, polycarbonate polyols, and polycaprolactone polyols.

Polyester polyols for use according to this disclosure are reaction products of a polybasic acid and a polyhydric alcohol. Suitable polybasic acids for use according to this disclosure include, but are not limited to, succinic acid, adipic acid, azelaic acid, sebacic acid, dodecanedicarboxylic acid, maleic anhydride, fumaric acid, 1,3-cyclopentanedicarboxylic acid, 1,4-cyclohexanedicarboxylic acid, terephthalic acid, isophthalic acid, phthalic acid, 1,4-naphthalenedicarboxylic acid, 2,5-naphthalenedicarboxylic acid, 2,6-naphthalenedicarboxylic acid, naphthalic acid, biphenyldicarboxylic acid, 1,2-bis(phenoxy)ethane-p,p'-dicarboxylic acid, and anhydrides or ester-forming derivatives of these dicarboxylic acids; and p-hydroxybenzoic acid, p-(2-hydroxyethoxy)benzoic acid, and ester-forming derivatives or dimer acids of these dihydroxycarboxylic acids; and mixtures of two or more thereof.

Any known polyhydric alcohol can be used. Specific examples of a polyhydric alcohol include, but are not limited to, glycols such as ethylene glycol, propylene glycol, 1,3-propanediol, 1,4-butanediol, 1,5-pentanediol, 3-methyl-1,5-pentanediol, 1,6-hexanediol, neopentylglycol, methylpentanediol, dimethylbutanediol, butylethylpropanediol, diethylene glycol, triethylene glycol, tetraethylene glycol, dipropylene glycol, tripropylene glycol, bishydroxyethoxybenzene, 1,4-cyclohexanediol, 1,4-cyclohexanedimethanol, triethylene glycol, polycaprolactone diol, dimer diol, bisphenol A, and hydrogenated bisphenol A; polyesters produced through ring opening polymerization of cyclic ester compounds, such as propiolactone, butyrolactone, ε-caprolactone, δ-valerolactone, and β-methyl-δ-valerolactone; and polyethers produced from addition polymerization of one or more monomers including ethylene oxide, propylene oxide, butylene oxide, styrene oxide, epichlorohydrin, tetrahydrofuran, and cyclohexylene in the usual manner with the aid of one or more compounds containing two active hydrogen atoms as an initiator, e.g., ethylene glycol, diethylene glycol, triethylene glycol, propylene glycol, trimethylene glycol, 1,3-butanediol, 1,4-butanediol, 1,6-hexanediol, and neopentylglycol; and mixtures of two or more thereof.

Adhesion Promoter

In some embodiments, an adhesion promoter can be incorporated in the isocyanate component, the polyol component, or in both components of the disclosed adhesive compositions. Examples of the adhesion promoter for use according to this disclosure include, but are not limited to, coupling agents such as a silane coupling agent, a titanate coupling agent, and an aluminate coupling agent; epoxy resins, phosphoric acid, polyphosporic acid, phosphate esters, and combinations of two or more thereof.

Examples of the silane coupling agent for use according to this disclosure include, but are not limited to, aminosilane such as γ-aminopropyltriethoxysilane, γ-aminopropyltrimethoxysilane, N-β(aminoethyl)-γ-aminopropyltrimethoxysilane, N-β(aminoethyl)-γ-aminopropyltrimethyl dimethoxysilane, and N-phenyl-γ-aminopropyltrimethoxysilane; epoxysilane such as β-(3,4-epoxycyclohexyl)-ethyltrimethoxysilane, γ-glycidoxypropyltrimethoxysilane, and γ-glycidoxypropyltriethoxysilane; vinylsilane such as vinyl tris(β-methoxyethoxy)silane, vinyltriethoxysilane, vinyltrimethoxysilane, and γ-methacryloxypropyltrimethoxysilane; hexamethyldisilazane; γ-mercaptopropyltrimethoxysilane.

Examples of the titanate coupling agent for use according to this disclosure include, but are not limited to, tetraisopropoxy titanium, tetra-n-butoxy titanium, butyl titanate dimer, tetrastearyl titanate, titanium acetylacetonate, titanium lactate, tetraoctyleneglycol titanate, titanium lactate, and tetra stearoxy titanium.

Examples of the epoxy resin for use according to this disclosure include, but are not limited to, a variety of commercially available epoxy resins such as bisphenol A-epichlorohydrin (epi-bis) type epoxy resin, novolak type epoxy resin, β-methylepichlorohydrin type epoxy resin, cyclic oxirane type epoxy resin, glycidyl ether type epoxy resin, glycidyl ester type epoxy resin, polyglycol ether type epoxy resin, glycol ether type epoxy resin, epoxidation fatty acid ester type epoxy resin, polycarboxylic acid ester type epoxy resin, aminoglycidyl type epoxy resin, and resorcin type epoxy resin.

Laminate Formation

A method of forming a laminate using an adhesive composition is also disclosed. Preferably, the adhesive composition, such as an adhesive composition comprising the mixed isocyanate and polyol components discussed above, is in a liquid state at 25° C. Even if the composition is solid at 25° C., it is acceptable to heat the composition as necessary to put it in a liquid state. In some embodiments, a layer of the composition is applied to a surface of a first substrate, such as a film. A "film" is any structure that is 0.5 mm or less in one dimension and is 1 cm or more in both of the other two dimensions. A polymer film is a film that is made of a polymer or mixture of polymers. In some embodiments, the composition of a polymer film is 80 percent by weight or more one or more polymers. In some embodiments, the thickness of the layer of the curable adhesive mixture is 1 to 5 μm.

In some embodiments, a surface of a second substrate or film is brought into contact with the layer of the curable mixture to form an uncured laminate. In some embodiments, the uncured laminate may be subjected to pressure, for example by passing through nip rollers, which may or may not be heated. In some embodiments, the uncured laminate may be heated to speed the cure reaction. However, the uncured laminate can reach full cure within two to three days at ambient temperature for aromatic isocyanate-based adhesives, or one to two weeks in the case of aliphatic isocyanate-based adhesives.

Suitable substrates for use according to this disclosure include, but are not limited to, films such as paper, woven and nonwoven fabric, metal foil, polymers, and metal-coated polymers. Films optionally have a surface on which an image is printed with ink; the ink may be in contact with the adhesive composition.

EXAMPLES OF THE DISCLOSURE

The present disclosure will now be explained in further detail by showing Illustrative Examples and Comparative Examples (collectively, "the Examples"). However, the scope of the present disclosure is not, of course, limited to the Examples.

Bond Strength Measurement

A 90° T-peel test is performed on laminate samples cut to 15 mm or 25.4 mm (1 inch) wide strips and pulled on a THWING ALBERT™ QC-3A peel tester equipped with a 50N loading cell at a rate of 10 inch/min on 1 inch strips. When the two films forming the laminate separate, i.e., peel, the average of the force during the pull is recorded. If one of the films stretches or breaks, the maximum force or force at break is recorded. The value recorded is the average of testing performed on three separate laminate samples.

The failure mode ("FM") or mode of failure ("MOF") is recorded as follows: "FS" indicates a film that stretches; "FT" indicates a film that tears or breaks; "AF" indicates adhesive failure, wherein adhesive on a primary film fails to adhere to a secondary film; "AT" indicates adhesive transfer, wherein adhesive fails to adhere to the primary film and is transferred to the secondary film; "AS" indicates adhesive split or cohesive failure, wherein adhesive is found on both primary and secondary film; "MT" indicates transfer of metal from a metalized film to a secondary film ("PMT" indicates partial metal transfer).

The initial bonds, or "green" bonds, are tested as soon as possible after the laminate is made. Additional T-peel tests are conducted at time intervals as indicated below, such as after one day and after seven days after the laminate is made.

Boil-in-Bag Test Procedure

Laminates are made from the "prelam" film, Prelam Al, and GF-19, as well as 92-LBT and GF-19, as described below. A 9"×12" (23 cm×30.5 cm) sheet of laminate is folded over to give a double layer of about 9"×6" (23 cm×15.25 cm) such that the polyethylene film of one layer is in contact with the polyethylene film of the other layer. The edges are trimmed on a paper cutter to give a folded piece about 5"×7" (12.7 cm×17.8 cm). Two long sides and one short side are heat sealed at the edges to give a finished pouch with an interior size of 4"×6" (10.2 cm×15.2 cm). The heat sealing is carried out at 177° C. (350° F.) for one second at a hydraulic pressure of 276 kPa (40 psi). More than one pouch is made for each test.

The pouches are filled through the open side with 100±5 ml of "1:1:1 sauce" (blend of equal parts by weight of ketchup, vinegar, and vegetable oil). During filling, splashing the sauce onto the heat seal area is avoided as this can cause the heat seal to fail during the testing. After filling, the top of the pouch is sealed in a manner that minimizes air entrapment inside of the pouch.

The seal integrity is inspected on all four sides of each pouch to ensure that there are no flaws in the sealing that could cause the pouch to leak during testing. Any suspect pouches are discarded and replaced with pouches acceptable for testing. In some instances, flaws in the laminate are marked to identify whether new, additional flaws are generated during the testing.

A pot is filled two-thirds full with water which is brought to a rolling boil. After boiling is achieved, the pot is covered with a lid to minimize water and steam loss. The pot is observed during the test to ensure that there is enough water present to maintain boiling. The pouches are placed in the boiling water and kept boiling for thirty minutes. The pouches are removed and the extent of tunneling, blistering, de-lamination, and/or leakage is compared with the marked preexisting flaws, if any. The observations are recorded. The pouches are then cut open, emptied, and rinsed with soap and water. One or more 1" (2.54 cm) strips are cut from the pouches and the laminate bond strength is measured according to the standard bond strength test described previously. This is done as soon as possible after removing the pouch contents. The interiors of the pouches are examined and any other visual defects are recorded.

Chemical Aging Test Procedure

Laminates are made from the "prelam" film, Prelam Al, and GF-19, as well as Prelam Al/cast polypropylene, as described below. A 9"×12" (23 cm×30.5 cm) sheet of laminate is folded over to give a double layer about 9"×6" (23 cm×15.25 cm) such that the polyethylene film of one layer is in contact with the polyethylene film of the other layer. The edges are trimmed on a paper cutter to give a folded piece about 5"×7" (12.7×17.8 cm). Two long sides and one short side are heat sealed at the edges to give a finished pouch with an interior size of 4"×6" (10.2 cm×15.2 cm). The heat sealing is carried out at 177° C. (350° F.) for one second at a hydraulic pressure of 276 kpa (40 PSI). More than one pouch is made for each test.

The pouches are filled through the open edge with 100±5 ml of "1:1:1 sauce" (blend of equal parts by weight of ketchup, vinegar, and vegetable oil). During filling, splashing the 1:1:1 sauce onto the heat seal area is avoided as this can cause the heat seal to fail during testing. After filling, the top of the pouch is sealed in a manner that minimizes air entrapment inside of the pouch.

The seal integrity is inspected on all four sides of pouches to ensure that there are no flaws in the sealing that could cause the pouch to leak during testing. Any suspect pouches are discarded and replaced with pouches acceptable for testing. In some instances, flaws in the laminate are marked to identify whether new, additional flaws are generated during the testing.

The pouches containing the 1:1:1 sauce are placed in an convection oven set at 50° C. for 100 hours. The pouches are removed after aging and the extent of tunneling, blistering, de-lamination, and/or leakage is compared with any of the marked preexisting flaws. The observations are recorded. The pouches are cut open, emptied, and rinsed with soap and water. One or more 1" (2.54 cm) strips are cut from the pouches and the laminate bond strength is measured according to the standard bond strength test described earlier. This is done as soon as possible after removing the pouch contents. The interiors of the pouches are examined and any other visual defects are recorded.

Viscosity and Potlife Measurements

Viscosity of the isocyanate and isocyanate reactive components is measured on a Brookfield DV-II viscometer at given temperature. Potlife of an adhesive at a given temperature is defined as the time it takes for the adhesive to reach 4,500 cps at the temperature, and is measured on a Brookfield DV-II viscometer.

The raw materials for use in the Illustrative Examples ("IE") and Comparative Examples ("CE") are detailed in Table 1 below.

Composition Preparation

Some of the raw materials used to prepare the Examples are identified in Table 1 below by name, general description, and commercial supplier.

TABLE 1

Raw Materials

| Name | Description | Commercial Supplier |
|---|---|---|
| ADCOTE ™ 111X43 | 2,000 molecular weight polyester diol | The Dow Chemical Company |
| MOR-FREE ™ 218 | 1,000 molecular weight polyester diol | The Dow Chemical Company |

TABLE 1-continued

Raw Materials

| Name | Description | Commercial Supplier |
|---|---|---|
| ADCOTE ™ X108-53 | A 1,000 molecular weight polyester diol | The Dow Chemical Company |
| ADCOTE ™ L87-118 | Phosphate ester with 75% solids content | The Dow Chemical Company |
| VORAPEL ™ T5001 | 600 molecular weight triol based on butylene oxide | The Dow Chemical Company |
| VORANOL ™ CP 755 | 700 molecular weight triol based on polypropylene oxide | The Dow Chemical Company |
| VORANOL ™ CP 1055 | 1,080 molecular weight triol based on polypropylene oxide | The Dow Chemical Company |
| MOR-FREE ™ C117 | 650 molecular weight branched polyester polyol with an average functionality of 2.15 | The Dow Chemical Company |
| ISONATE ™ 125M | 4,4'-methylenediphenyl diisocyanate | The Dow Chemical Company |
| ISONATE ™ 143L | 4,4'-methylenediphenyl diisocyanate | The Dow Chemical Company |
| POLYG ™ 30-112 | 1,500 molecular weight triol based on polypropylene oxide | Arch Chemicals |
| Prelam AL Film | Polyethylene terephthalate film having thickness of 12 μm laminated to soft lamination grade AMCOR ™ aluminum foil having thickness of 9 μm with ADCOTE ™ 550/COREACTANT F ™ | AMPAC Company |
| GF-19 Film | Polyethylene sealant film containing slip additives | Berry Plastics Corporation |

Illustrative Example 1 ("IE1")

Isocyanate Component

A lab glass reactor consisting of a 4-neck flask equipped with a mechanical stirrer and a temperature controller is used to produce the isocyanate component. Under nitrogen purge, 449.7 grams of ISONATE™ 125M premelted at 45° C. is loaded to the flask. The reactor temperature is set to 50° C. With agitation on, 220.1 grams of MOR-FREE™ 218 is charged to the reactor. Cooling is applied if the temperature exceeds 75° C. After the reactor temperature cools to between 50° C. to 60° C., 330.2 grams of ADCOTE™ X111-43 is charged to the reactor. After reacting at 75° C. for two hours, 100 grams of ISONATE™ 143L is added to the reactor. After one more hour in the reactor at 75° C., a clear, low viscosity prepolymer is obtained. The prepolymer is found to have a NCO content of 13.3% and a viscosity of 6,800 cps at 45° C.

Polyol Component

A lab glass reactor consisting of a 4-neck flask equipped with a mechanical stirrer and a temperature controller is used to produce the polyol component. The reactor temperature is set to 65° C. Under nitrogen purge and with agitation on, 900 grams of VORAPEL™ T5001 is charged to the reactor, followed by the addition of 100 grams of ADCOTE L87-118. The temperature of the reactor is then raised to 75° C. With continuous nitrogen purge, after mixing at 75° C. for 120 minutes, a clear, low viscosity liquid is obtained having a volatile content less than 0.1%, an OH number of 230, and a viscosity of 365 cps at 25° C.

Adhesive Characteristics 10 grams of the polyol component and 14.9 grams of the isocyanate component are mixed at a stoichiometric ratio of 1.0:1.15 (OH/NCO). The viscosity buildup of this formulated adhesive is measured on a Brookfield DV-II viscometer at 45° C. The adhesive has an initial application viscosity of 975 cps, and a potlife of 35 minutes.

Laminate Structure Performance 10 grams of the polyol component and 14.9 grams of the isocyanate component are mixed at a stoichiometric ratio of 1.0:1.15 (OH/NCO), followed by the addition of 37.5 grams of ethyl acetate to form a 40% solid solution. The adhesive is used to bond Prelam Al and GF-19 substrates. The GF-19 film is corona treated at a level of 0.14 KW before lamination. The adhesive is first hand coated onto the primary substrate (Prelam Al) with a coating weight of about 1.1 lb/rm. After drying for one minute in an oven set to 90° C., the primary film (Prelam Al) is laminated to the secondary film (GF-19) on an oil-based laminator with a nip temperature set to about 65° C. At least five laminates (8"×11") are prepared for each formulation with a bond strip within the laminate to facilitate bond strength testing. The produced laminates are then cured at 22° C. and 50% relative humidity.

Bond strength of the laminate structure is measured at four hours, one day, three days, and seven days according to the test procedures described above. After seven days, the laminate structure is subjected to the boil-in-bag and 1:1:1 sauce aging tests described above. After the boil-in-bag and 1:1:1 sauce aging tests, the pouches are cut open, washed clean, and examined for failure modes. Bond strength of the laminate is measured and recorded. Results on bond strength and failure mode of the laminate structure are summarized in Table 2.

Illustrative Example 2 ("IE2")

Isocyanate Component

The isocyanate component is kept the same as in IE1 while the polyol component is formulated differently.

Polyol Component

A lab glass reactor consisting of a 4-neck flask equipped with a mechanical stirrer and a temperature controller is used to produce the polyol component. The reactor temperature is set to 65° C. Under nitrogen purge and with agitation on, 500 grams of VORAPEL™ T5001 and 400 grams of VORANOL™ CP 755 are charged to the reactor, followed by the addition of 100 grams of ADCOTE™ L87-118. The temperature of the reactor is then raised to 75° C. With continuous nitrogen purge, after mixing at 75° C. for 120 minutes, a clear, low viscosity liquid is obtained having a volatile content less than 0.1%, an OH number of 233, and a viscosity of 305 cps at 25° C.

Adhesive Characteristics 10 grams of the polyol component and 15.1 grams of the isocyanate component are mixed at a stoichiometric ratio of 1.0:1.15 (OH/NCO). The viscosity buildup of this formulated adhesive is measured on a Brookfield DV-II viscometer at 45° C. The adhesive has an initial application viscosity of 925 cps, and a potlife of 37 minutes.

Laminate Structure Performance 10 grams of the polyol component and 15.1 grams of the isocyanate component are mixed at a stoichiometric ratio of 1.0:1.15 (OH/NCO), followed by addition of 37.5 grams of ethyl acetate to form a 40% solid solution. The adhesive is used to bond Prelam Al and GF-19 substrates. The GF-19 film is corona treated at a level of 0.14 KW before lamination. The adhesive is first hand coated onto the primary substrate (Prelam Al) with a coating weight of about 1.1 lb/rm. After drying for one minute in an oven set to 90° C., the primary film (Prelam Al) is laminated to the secondary film (GF-19) on an oil based laminator with nip temperature set to about 65° C. At least five laminates (8"×11") are prepared for each formulation with bond strip within the laminate to facilitate bond strength testing. The produced laminates are then cured at 22° C. and 50% relative humidity.

Bond strength of the laminate structure is measured at four hours, one day, three days, and seven days according to the test protocol described earlier. After seven days, the laminate structure is subjected to the boil-in-bag and 1:1:1 sauce aging tests described above. After the boil-in-bag and 1:1:1 sauce aging tests, the pouches are cut open, washed clean, and examined for failure modes. Bond strength of the laminate is measured and recorded. Results on bond strength and failure mode of the laminate structure are summarized in Table 2.

Illustrative Example 3 ("IE3")

Isocyanate Component

A lab glass reactor consisting of a 4-neck flask equipped with a mechanical stirrer and a temperature controller is used to produce the isocyanate component. Under nitrogen purge, 449.7 grams of ISONATE™ 125M premelted at 45° C. is loaded to the flask. The temperature of the reactor is set to 50° C. With agitation on, 220.1 grams of ADCOTE™ X108-53 is charged to the reactor. Cooling is applied if the temperature exceeds 75° C. After the reactor temperature cooled down to between 50° C. and 60° C., 330.2 grams of ADCOTE™ X111-43 is charged to the reactor. After reacting at 75° C. for two hours, 100 grams of ISONATE™ 143L is added to the reactor. After reacting one more hour at 75° C., a clear, low viscosity prepolymer is obtained having a NCO content of 13.2% and a viscosity of 6,800 cps at 45° C.

Polyol Component

The polyol component is kept the same as in IE1.

Adhesive Characteristics 10 grams of the polyol component and 14.9 grams of the isocyanate component are mixed at a stoichiometric ratio of 1.0:1.15 (OH/NCO). The viscosity buildup of this formulated adhesive is measured on a Brookfield DV-II viscometer at 45° C. The adhesive has an initial application viscosity of 938 cps, and a potlife of 36 minutes.

Laminate Structure Performance 10 grams of the polyol component and 14.9 grams of the isocyanate component are mixed at a stoichiometric ratio of 1.0:1.15 (OH/NCO), followed by the addition of 37.5 grams of ethyl acetate to form a 40% solid solution. The adhesive is used to bond Prelam Al and GF-19 substrates. The GF-19 film is corona treated at a level of 0.14 KW before lamination. The adhesive is first hand coated onto the primary substrate (Prelam Al) with a coating weight about 1.1 lb/rm. After drying for one minute in an oven set to 90° C., the primary film (Prelam Al) is laminated to the secondary film (GF-19) on an oil based laminator with nip temperature set at 65° C. At least five laminates (8"×11") are prepared for each formulation with bond strip within the laminate to facilitate bond strength testing. The produced laminates are then cured at 22° C. and 50% relative humidity.

Bond strength of the laminate structure is measured at four hours, one day, three days, and seven days according to the test protocol described above. After seven days, the laminate structure is subjected to the boil-in-bag and 1:1:1 sauce aging tests described above. After the boil-in-bag and 1:1:1 sauce aging tests, the pouches are cut open, washed clean, and examined for failure modes. Bond strength of the laminate is measured and recorded. Results on bond strength and failure mode of the laminate structure are summarized in Table 2.

Illustrative Example 4 ("IE4")

Isocyanate Component

The isocyanate component is kept the same as in IE3 while the polyol component is formulated differently.

Polyol Component

The polyol component is kept the same as in IE2

Adhesive Characteristics 10 grams of the polyol component and 15.1 grams of the isocyanate component are mixed at a stoichiometric ratio of 1.0:1.15 (OH/NCO). The viscosity buildup of this formulated adhesive is measured on a Brookfield DV-II viscometer at 45° C. The adhesive has an initial application viscosity of 935 cps, and a potlife of 38 minutes.

Laminate Structure Performance 10 grams of the polyol component and 15.1 grams of the isocyanate component are mixed at a stoichiometric ratio of 1.0:1.15 (OH/NCO), followed by addition of 37.5 grams of ethyl acetate to form a 40% solid solution. The adhesive is used to bond Prelam Al and GF-19. The GF-19 film is corona treated at a level of 0.14 KW before lamination. The adhesive is first hand coated onto the primary substrate (Prelam Al) with a coating weight of about 1.1 lb/rm. After drying for one min in an oven set at 90° C., the primary film (Prelam Al) is laminated to the secondary film (GF-19) on an oil-based laminator with a nip temperature set to about 65° C. At least five laminates (8"×11") are prepared for each formulation with bond strip within the laminate to facilitate bond strength testing. The produced laminates are then cured at 22° C. and 50% relative humidity.

Bond strength of the laminate structure is measured at four hours, one day, three days, and seven days according to the test protocol described earlier. After seven days, the laminate structure is subjected to the boil-in-bag and 1:1:1 sauce aging tests described earlier. After the boil-in-bag and 1:1:1 sauce aging tests, the pouches are cut open, washed clean, and examined for failure modes. Bond strength of the laminate is measured and recorded. Results on bond strength and failure mode of the laminate structure are summarized in Table 2.

Illustrative Example 5 ("IE5")

Isocyanate Component

The isocyanate component is kept the same as in IE.3

Polyol Component

A lab glass reactor consisting of a 4-neck flask equipped with a mechanical stirrer and a temperature controller is used to produce the isocyanate reactive component. The reactor temperature is set to 65° C. Under nitrogen purge and with agitation on, 900 grams of VORANOL™ CP 755 is charged to the reactor, followed by the addition of 100 grams of ADCOTE™ L87-118. The temperature of the reactor is then raised to 75° C. With continuous nitrogen purge, after mixing at 75° C. for 120 minutes, a clear, low viscosity liquid is obtained having a have volatile content less than 0.1%, an OH number of 236, and a viscosity of 295 cps at 25° C.

Adhesive Characteristics 10 grams of the polyol component and 15.3 grams of the isocyanate component are mixed at a stoichiometric ratio of 1.0:1.15 (OH/NCO). The viscosity buildup of this formulated adhesive is measured on a Brookfield DV-II viscometer at 45° C. The adhesive has an initial application viscosity of 938 cps, and a potlife of 39 minutes.

Laminate Structure Performance 10 grams of the polyol component and 15.3 grams of the isocyanate component are mixed at a stoichiometric ratio of 1.0:1.15 (OH/NCO), followed by addition of 37.5 grams of ethyl acetate to form a 40% solid solution. The adhesive is used to bond Prelam Al and GF-19 substrates. The GF-19 film is corona treated at a level of 0.14 KW before lamination. The adhesive is first hand coated onto the primary substrate (Prelam Al) with a coating weight about 1.1 lb/rm. After drying for one minute in an oven set to 90° C., the primary film (Prelam Al) is laminated to the secondary film (GF-19) on an oil-based laminator with nip temperature set to about 65° C. At least five laminates (8"×11") are prepared for each formulation with bond strip within the laminate to facilitate bond strength testing. The produced laminates are then cured at 22° C. and 50% relative humidity.

Bond strength of the laminate structure was measured at four hours, one day, three days, and seven days according to the test protocol described earlier. After seven days, the laminate structure is subjected to the boil-in-bag and 1:1:1 sauce aging tests described earlier. After the boil-in-bag and 1:1:1 sauce aging tests, the pouches are cut open, washed clean, and examined for failure modes. Bond strength of the laminate is measured and recorded. Results on bond strength and failure mode of the laminate structure are summarized in Table 2.

Comparative Example 1 ("CE1")

Isocyanate Component

The isocyanate component is kept the same as in IE2 while the polyol component is changed.

Polyol Component

A lab glass reactor consisting of a 4-neck flask equipped with a mechanical stirrer and a temperature controller is used to produce the polyol component. The reactor temperature is set to 65° C. Under nitrogen purge and with agitation on, 900 grams of VORANOL™ CP 1055 is charged to the reactor, followed by the addition of 100 grams of ADCOTE™ L87-118. The temperature of the reactor is then raised to 75° C. With continuous nitrogen purge, after mixing at 75° C. for 120 minutes, a clear, low viscosity liquid is obtained having a volatile content less than 0.1%, an OH number of 162, and a viscosity of 345 cps at 25° C.

Adhesive Characteristics 10 grams of the polyol component and 14.9 grams of the isocyanate component are mixed at a stoichiometric ratio of 1.0:1.15 (OH/NCO). The viscosity buildup of the formulated adhesive is measured on a Brookfield DV-II viscometer at 45° C. The adhesive has an initial application viscosity of 945 cps, and a potlife of 40 minutes.

Laminate Structure Performance 10 grams of the polyol component and 10.5 grams of the isocyanate component are mixed at a stoichiometric ratio of 1.0:1.15 (OH/NCO), followed by addition of 30.75 grams of ethyl acetate to form a 40% solid solution. The adhesive is used to bond Prelam Al and GF-19. The GF-19 film is corona treated at a level of 0.14 KW before lamination. The adhesive is first hand coated onto the primary substrate (Prelam Al) with a coating weight about 1.1 lb/rm. After drying for one minute in an oven set to 90° C., the primary film (Prelam Al) is laminated to the secondary film (GF-19) on an oil-based laminator with nip temperature set to about 65° C. At least five laminates (8"×11") are prepared for each formulation with bond strip within the laminate to facilitate bond strength testing. The produced laminates are then cured at 22° C. and 50% relative humidity.

Bond strength of the laminate structure is measured at four hours, one day, three days, and seven days according to the test protocol described earlier. After seven days, the laminate structure is subjected to the boil-in-bag and 1:1:1 sauce aging tests described earlier. After the boil-in-bag and 1:1:1 sauce aging tests, the pouches are cut open, washed clean, and examined for failure modes. Bond strength of the laminate is measured and recorded. Results on bond strength and failure mode of the laminate structure are summarized in Table 2.

Comparative Example 2 ("CE2")

Isocyanate Component

The isocyanate component is kept the same as in IE2 while the polyol component is changed.

Polyol Component

A lab glass reactor consisting of a 4-neck flask equipped with a mechanical stirrer and a temperature controller is used to produce the polyol component. The reactor temperature is set to 65° C. Under nitrogen purge and with agitation on, 900 grams of POLY-G™ 30-112 is charged to the reactor, followed by the addition of 100 grams of ADCOTE™ L87-118. The temperature of the reactor is then raised to 75° C. With continuous nitrogen purge, after mixing at 75° C. for 120 minutes, a clear, low viscosity liquid is obtained having a volatile content less than 0.1%, an OH number of 121, and a viscosity of 305 cps at 25° C.

Adhesive Characteristics 10 grams of the polyol component and 7.9 grams of the isocyanate component are mixed at a stoichiometric ratio of 1.0:1.15 (OH/NCO). The viscosity buildup of the formulated adhesive is measured on a Brookfield DV-II viscometer at 45° C. The adhesive has an initial application viscosity of 956 cps, and a potlife greater than 60 minutes.

Laminate Structure Performance 10 grams of the polyol component and 7.9 grams of the isocyanate component are mixed at a stoichiometric ratio of 1.0:1.15 (OH/NCO), followed by addition of 26.85 grams of ethyl acetate to form a 40% solid solution. The adhesive is used to bond Prelam Al and GF-19 substrates. The GF-19 film is corona treated at a level of 0.14 KW before lamination. The adhesive is first hand coated onto the primary substrate (Prelam Al) with a coating weight of about 1.1 lb/rm. After drying for one minute in an oven set to 90° C., the primary film (Prelam Al) is laminated to the secondary film (GF-19) on an oil-based laminator with nip temperature set to about 65° C. At least five laminates (8"×11") are prepared for each formulation with bond strip within the laminate to facilitate bond strength testing. The produced laminates are then cured at 22° C. and 50% relative humidity.

Bond strength of the laminate structure is measured at four hours, one day, three days, and seven days according to the test protocol described earlier. After seven days, the laminate structure is subjected to the boil-in-bag and 1:1:1 sauce aging tests described earlier. After the boil-in-bag and 1:1:1 sauce aging tests, the pouches are cut open, washed clean, and examined for failure modes. Bond strength of the laminate is measured and recorded. Results on bond strength and failure mode of the laminate structure are summarized in Table 2.

Comparative Example 3 ("CE3")

Isocyanate Component

The isocyanate component is kept the same as in IE2 while the polyol component is changed.

Polyol Component

A lab glass reactor consisting of a 4-neck flask equipped with a mechanical stirrer and a temperature controller is used to produce the polyol component. The reactor temperature is set to 65° C. Under nitrogen purge and with agitation on, 900 grams of MOR-FREE™ C117, a coreactant designed for solventless adhesives, is charged to the reactor, followed by the addition of 100 grams of ADCOTE™ L87-118. The temperature of the reactor is then raised to 75° C. With continuous nitrogen purge, after mixing at 75° C. for 120 minutes, a clear, low viscosity liquid is obtained having a volatile content less than 0.1%, an OH number of 184, and a viscosity of 6,000 cps at 25° C.

Adhesive Characteristics 10 grams of the polyol component and 11.9 grams of the isocyanate component are mixed at a stoichiometric ratio of 1.0:1.15 (OH/NCO). The viscosity buildup of this formulated adhesive is measured on a Brookfield DV-II viscometer at 45° C. The adhesive has an initial application viscosity of 3,112 cps, and a potlife less than 10 minutes.

The initial application viscosity for the adhesive is high and the potlife short, in comparison with the Illustrative Examples, indicating that MOR-FREE™ C117 alone is not suitable as a coreactant for solventless adhesives based on the isocyanate component according to one or more embodiments of this disclosure.

TABLE 2

Performance Results

| | Example 1 | Example 2 | Example 3 | Example 4 |
|---|---|---|---|---|
| Isocyanate Component | | | | |
| NCO Content, % | 13.3 | 13.3 | 13.2 | 13.2 |
| Viscosity @45° C., cPs | 2065 | 2065 | 1875 | 1875 |
| Polyester content in the polyol blend | >40% | >40% | >40% | >40% |
| Isocyanate Reactive Component | | | | |
| Average Mw | 732 | 723 | 732 | 723 |
| Average functionality | 3 | 3 | 3 | 3 |
| Viscosity at 25° C., cPs | 365 | 305 | 365 | 305 |
| Polyether content, % | >30% | >30% | >30% | >30% |
| Adhesive properties | | | | |
| NCO/OH index | 1.15 | 1.15 | 1.15 | 1.15 |
| Mixed viscosity @ 45° C. | 975 | 925 | 938 | 925 |
| Poltlife at 45° C., minutes | 35 | 37 | 36 | 37 |
| Performance Laminate Structure | Prelam Al/GF-19 | Prelam Al/GF-19 | Prelam Al/GF-19 | Prelam Al/GF-19 |
| 4-hour bond, g/inch | 244 ± 79 (AS) | 357 ± 20 (AS) | 312 ± 17 (AS) | 338 ± 39 (AS) |
| 1-day bond, g/inch | 1015 ± 43 (FS) | 973 ± 18 (FT) | 1207 ± 14 (FT) | 1048 ± 156 (FT) |
| 3-day bond, g/inch | 1054 ± 22 (FT) | 1074 ± 12 (FS) | 1321 ± 21 (FT) | 1104 ± 107 (FT) |
| 7-day bond, g/inch | 1124 ± 12 (FT) | 1059 ± 83 (FS) | 1308 ± 68 (FT) | 1222 ± 102 (FT) |
| Boil-in-bag, g/inch | 551 ± 99 (FS), no tunneling | 825 ± 25 (FS) no Tunneling | 737 ± 51 (AS) no tunneling | 650 ± 25 (AS), no tunneling |
| 1:1:1 sauce aging at 60° C. 100 hours, g/inch | 1033 ± 112 (FS) | | | 1024 ± 78 (FS) |

| | Example 5 | Comparative Example 1 | Comparative Example 2 | Comparative Example 3 |
|---|---|---|---|---|
| Isocyanate Component | | | | |
| NCO Content, % | 13.2 | 13.2 | 13.2 | 13.2 |
| Viscosity @45° C., cPs | 1875 | 1875 | 1875 | 1875 |
| Polyester content in the polyol blend | >40% | >40% | >40% | >40% |
| Isocyanate Reactive Component | | | | |
| Average Mw | 714 | 1038 | 1500 | 650 |
| Average functionality | 3 | 3 | 3 | 2.1 |
| Viscosity at 25° C., cPs | 295 | 345 | 305 | 6000 |
| Polyether content, % | >30% | >30% | >30% | <30% |
| Adhesive properties | | | | |
| NCO/OH index | 1.15 | 1.15 | 1.15 | 1.15 |
| Mixed viscosity @ 45° C. | 938 | 750 | 660 | 3125 |
| Poltlife at 45° C., minutes | 39 | 49 | >60 | <10 |
| Performance Laminate Structure | Prelam Al/GF-19 | Prelam Al/GF-19 | Prelam Al/GF-19 | NA |
| 4-hour bond, g/inch | 311 ± 18 (AS) | 163 ± 11 (AS) | 120 ± 7 (AS) | NA |

TABLE 2-continued

| | Performance Results | | | |
|---|---|---|---|---|
| 1-day bond, g/inch | 1183 ± 61 (FS) | 580 ± 85 (AT) | 223 ± 20 (AT) | NA |
| 3-day bond, g/inch | 1201 ± 57 (FT) | 744 ± 35 (AT) | 221 ± 8 (AT) | NA |
| 7-day bond, g/inch | 1201 ± 458 (FT) | 844 ± 47 (AT) | 228 ± 15 (AT) | NA |
| Boil-in-bag, g/inch | 1029 ± 93 (FS) no tunneling | Delaminated | Delaminated | NA |
| 1:1:1 sauce aging at 60° C. 100 hours, g/inch | 26 ± 14(AS) | Delaminated | Delaminated | NA |

As indicated in Table 2, the Illustrative Examples exhibit low application viscosity and long potlife, excellent bond strength at four hours, and film stretch/film tear after one day cure. These results are indicative of good processing characteristics, fast bond build-up, and good bond strength. In addition, the Illustrative Examples exhibit good temperature and chemical resistance, as demonstrated by the results from the boil-in-bag tests. The temperature and chemical resistance is further improved with a polyol component containing butylene oxide based polyols, as shown by the result of aging test performances of IE1 and IE4.

While CE1 and CE2 exhibit good processing characteristics (i.e., low viscosity and long potlife), bond development for these adhesives is sluggish, and the bond strength after one day of curing is much lower than that of the Illustrative Examples. Further, the adhesives of CE1 and CE2 fail to adhere to the primary substrate and are transferred to the secondary substrate. Still further, CE1 and CE2 fail to pass the boil-in-bag and heat/chemical aging tests, suggesting poor temperature and chemical resistance. The poor performance can be only attributed to the higher average molecular weight of the polyol component.

CE3 exhibits poor processing characteristics, as evidenced by the high application viscosity and short potlife. An adhesive with such processing characteristics would not be able to be applied to a substrate with commercial state-of-art laminators. The poor processing characteristics are attributed to the polyol component that contains less than 30% by weight of polyether polyols. The high polyester content in the polyol component results in higher application viscosity and short potlife of the adhesive.

The invention claimed is:

1. A two-component solventless adhesive composition, comprising:
   an isocyanate component comprising an isocyanate prepolymer that is the reaction product of a polyisocyanate and an isocyanate reactive component comprising at least 40 wt % of a polyester polyol, based upon the dry weight of the isocyanate reactive component;
   a polyol component, comprising at least 30 wt % based on upon the dry weight of the polyol component, of a copolymer polyol component selected from the group consisting of (i) a polybutylene oxide-propylene oxide copolymer polyol component, (ii) a polybutylene oxide-polyethylene oxide copolymer polyol component, and (iii) mixtures thereof, each copolymer polyol component having an average functionality between 2.5 and 4.5 and an average molecular weight between 250 and 1,000; and
   a phosphate ester adhesion promoter.

2. The two-component solventless adhesive composition of claim 1, wherein the polyol component further comprises at least one selected from polypropylene oxide polyol, a natural oil based polyol, a polyester polyol, and mixtures of two or more thereof.

3. The two-component solventless adhesive composition of claim 1, wherein the adhesion promoter is incorporated in the isocyanate component.

4. The two-component solventless adhesive composition of claim 1, wherein the adhesion promoter is incorporated in the polyol component.

5. The two-component solventless adhesive composition of claim 1, wherein the isocyanate component further comprises at least one isocyanate selected from a monomeric isocyanate, a polymeric isocyanate, and combinations thereof.

6. The two-component solventless adhesive composition of claim 5, wherein the isocyanate is selected from the group consisting of hexamethylene diisocyanate ("HDI") and isomers thereof, isophorone diisocyanate ("IPDI") and isomers thereof, norbornane diisocyanate ("NBDI") and isomers thereof, tetramethylxylylene diisocyanate ("TMXDI") and isomers thereof, xylylene diisocyanate ("XDI") and isomers thereof, toluene diisocyanate ("TDI") and isomers thereof, diphenylmethane diisocyanate ("MDI") and isomers thereof, 3,3'-dimethyl-4,4'-biphenyldiisocyanate ("TODI") and isomers thereof, isocyanate prepolymers thereof, and combinations of two or more thereof.

7. The two-component solventless adhesive composition of claim 1, further comprising an additive selected from the group consisting of a catalyst, a surfactant, a leveling agent, a defoamer, a rheology modifier, a color pigment, a solvent, and combinations of two or more thereof.

8. The two-component solventless adhesive composition of claim 1, wherein the stoichiometric ratio of the isocyanate component to the polyol component is from 1:1 to 2:1.

* * * * *